INVENTOR.
ERNEST C. HILL
BY Arthur L. Wade
ATTORNEY

3,348,601
MEANS FOR RECONCENTRATING LIQUID ABSORBENT

Ernest C. Hill, Tulsa, Okla., assignor to Combustion Engineering, Inc., New York, N.Y., a corporation of Delaware
Filed Dec. 21, 1964, Ser. No. 419,767
1 Claim. (Cl. 159—13)

This invention relates to reconcentrating a liquid absorbent by the application of heat and the use of a gas which is undersaturated with respect to the solute.

Liquid desiccants, such as the glycols, are quite useful in dehydrating natural gas streams. A contactor tower is normally provided in which liquid desiccant is brought into intimate contact with the natural gas stream to be dehydrated. The desiccant, enriched by the water, is removed from the gas stream and then normally reconcentrated by boiling off this solute with heat. The desiccant is then recirculated through the contactor vessel is a continuous operation.

There is a limit to the temperature to which commercially available liquid absorbents may be heated to reconcentrate them. Above this limit, the liquid absorbent begins to deteriorate, or break down, chemically. Unfortunately, the upper temperature limit established by the danger of chemical decomposition of liquid absorbent does not permit all the water to be driven out of the absorbent by heat alone.

By heat alone, triethylene glycol can be reconcentrated to about 98.5 percent by weight when its temperature level is at 380 degrees F. For many dehydration requirements, this degree of concentration is adequate. However, there are growing demands for higher concentrations, to obtain greater depressions of the dew point of gas streams. Substantially an additional one percent of reconcentration of the glycol type of absorbent meets these growing demands.

It is generally known to reduce the water content of thermally reconcentrated liquid absorbent by shifting the vapor equilibrium above the liquid phase. If enough vapor, undersaturated with respect to water, to available this shift can be carried out above the surface of a liqiud absorbent body of any size. A small part of the stream of natural gas, dehydrated by the absorbent of the system, can be used to shift the vapor equilibrium of the absorbent while heat is being applied to the absorbent. The absorbent, while being reconcentrated by heat, is also reconcentrated with the gas.

The present invention contemplates that asborbent be reconcentrated by heat and have its vapor equilibrium shifted by contact with unsaturated gas at the same time and within a common vessel.

A primary object of the invention is to simultaneously employ heat and undersaturated vapor to reconcentrate absorbent.

Another object is to apply the heat and vapor to reconcentrate absorbent within a single vessel.

Another object is to apply heat to the absorbent while counter-current flowing undersaturated gas with the heating absorbent in a path with a plurality of zones of differential vapor equilibrium.

The present invention contemplates the provision of a vessel of elongated form in which a heat source is longitudinally extended to heat absorbent flowed downwardly while undersaturated gas is flowed upwardly to reconcentrate the absorbent.

Other objects, advantages and features of this invention will become apparent tmo one skilled in the art upon consideration of the written specification, appended claim, and attached drawings, wherein;

GENERAL SYSTEM

Figure 1:
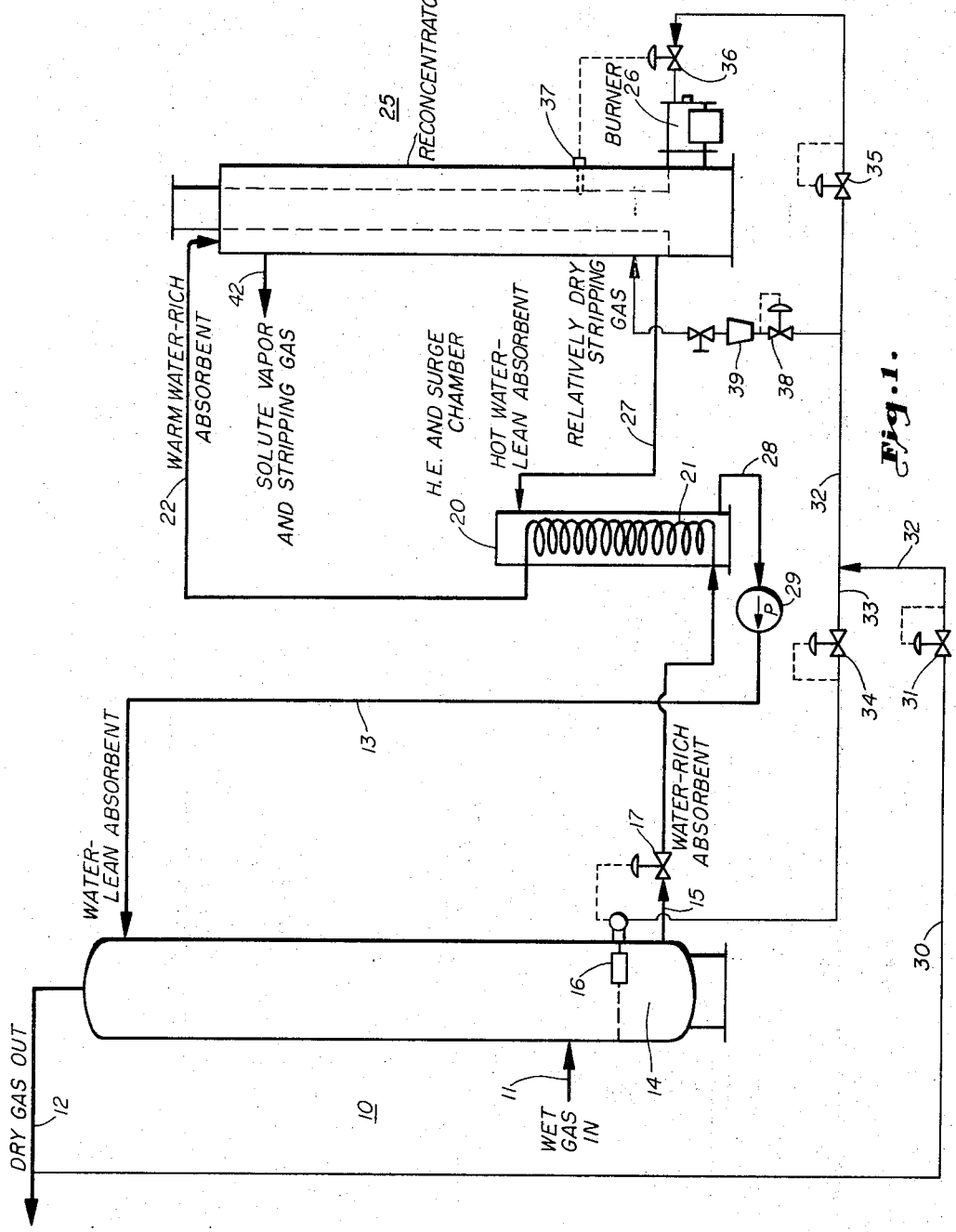
FIG. 1 is a diagrammatic representation of a complete system employing the liquid absorbent to dehydrate a natural gas stream.

Referring to FIG. 1, there is shown a complete system for dehydrating a natural gas stream, using liquid absorbent, and embodying the present invention. As disclosed in FIG. 1, the various units of the system are shown in the conventional arrangement for bringing liquid absorbent into proper contact with the natural gas stream to be dehydrated. The liquid absorbent is then reconcentrated by the simultaneous use of heat and undersaturated gas to lower the water content of the heating absorbent under the concepts of the present invention.

Contactor tower 10 is the starting point for analyzing the complete system. The wet natural gas is brought to tower 10 through conduit 11 connected into a lower section of the tower. The internal arrangement of tower 10 is conventional, the dried gas being withdrawn from the top of the tower through conduit 12.

The lean absorbent, for drying the gas, is inserted into tower 10 through conduit 13. After contact with the gas, the absorbent forms a collection 14 in the bottom of tower 10. The wet absorbent is drawn off through conduit 15 for reconcentration. The level of collection 14 is sensed by a float 16 which exerts a control over valve 17 to maintain the level of collection 14 and prevent this level from lowering to outlet conduit 15.

The wet absorbent, withdrawn through conduit 15, passes through valve 17 and is heat exchanged with reconcentrated absorbent in vessel 20. Vessel 20 primarily functions as a surge chamber for the liquid absorbent and doubles as a heat exchanger between the reconcentrated and wet absorbent. Conduit 15 conducts the wet absorbent into heat exchange coil 21 which is in direct contact with the volume of reconcentrated absorbent within vessel 20. Conduit 22 then conducts the warm rich absorbent to the reconcentrating equipment.

Figure 2:
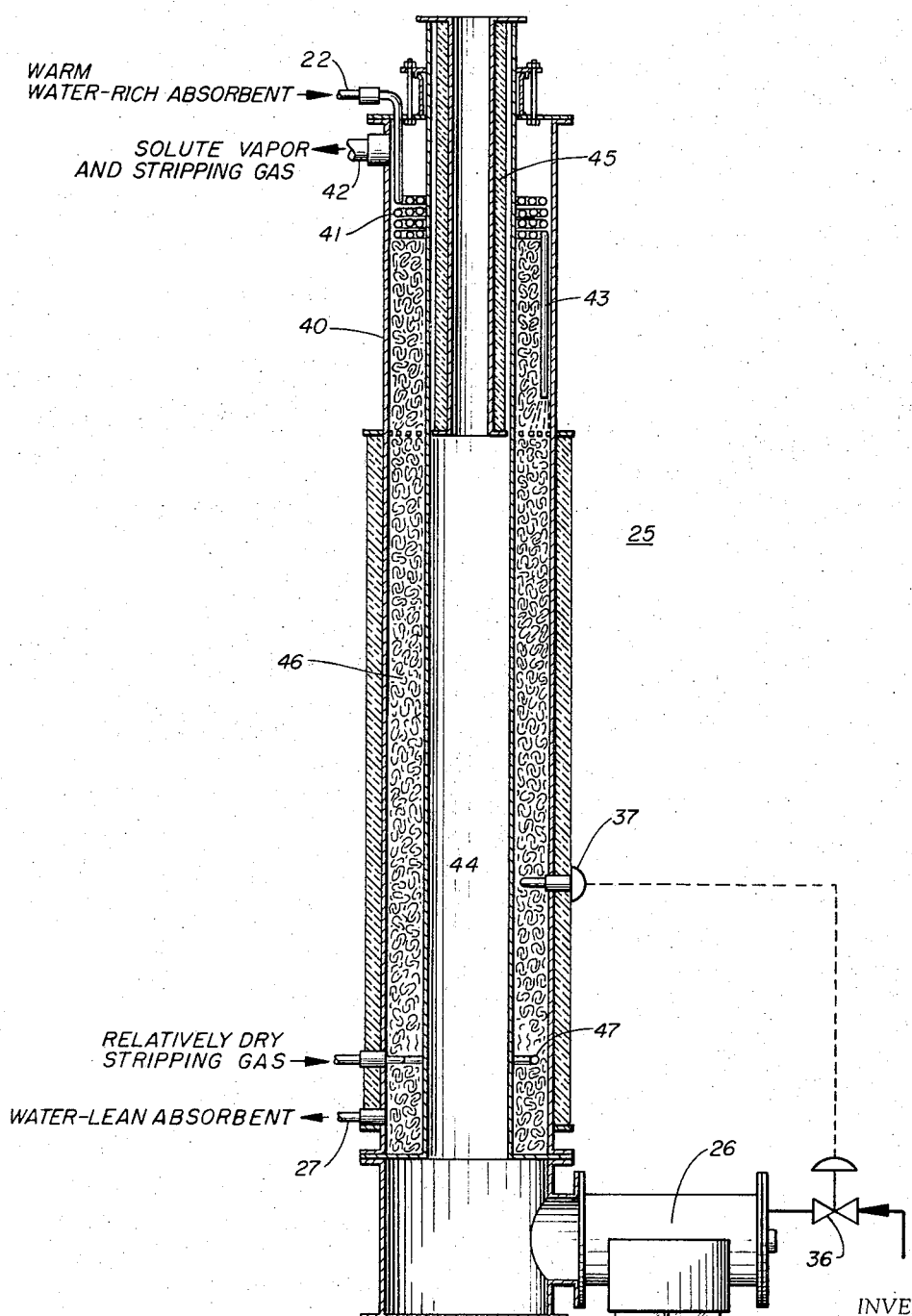
FIG. 2 is a sectioned elevation of the absorbent reconcentrator of FIG. 1 and its integral compartments in which heat and gas stripping is carried out in accordance with the present invention.
Figure 3:
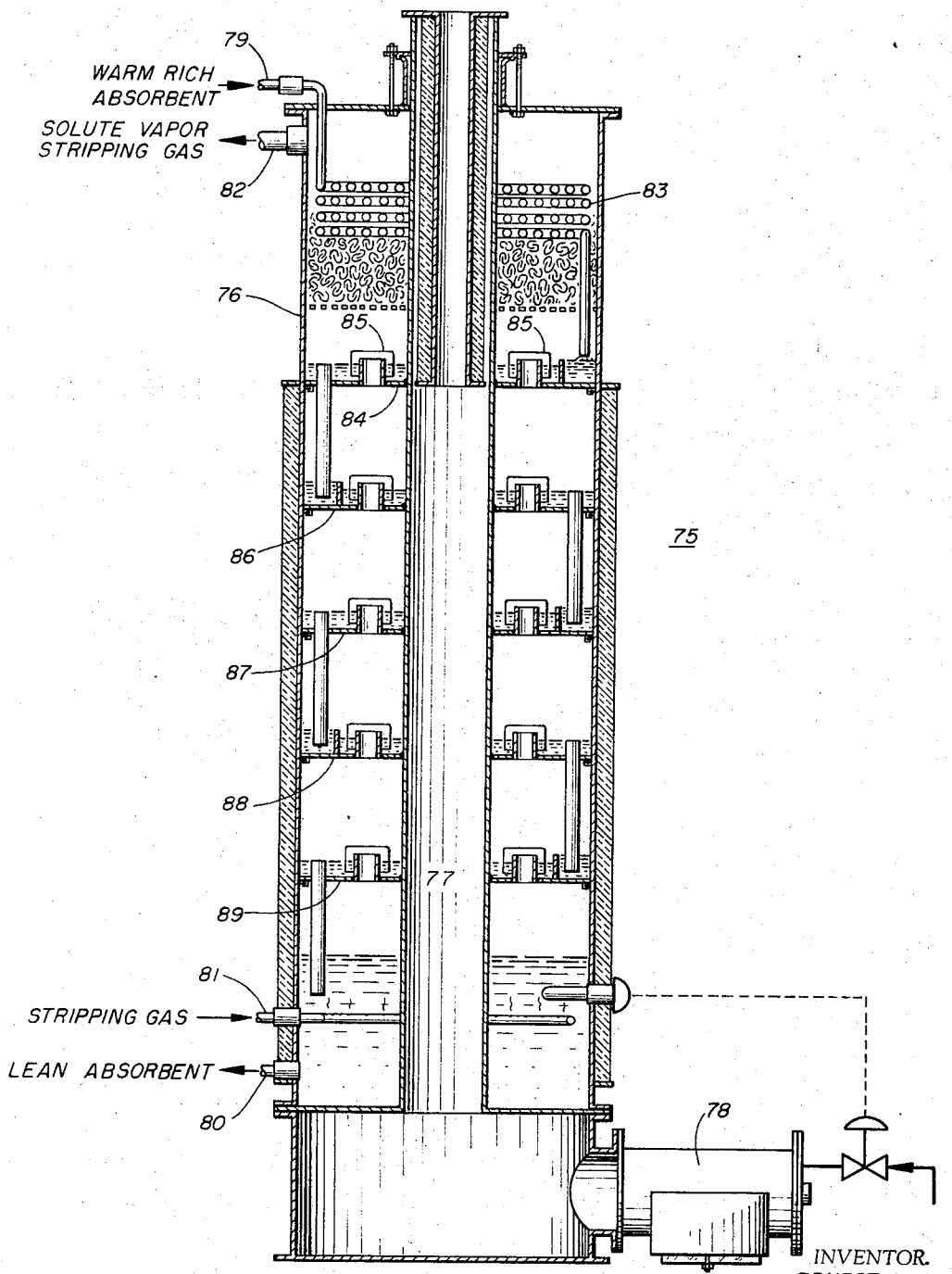
FIG. 3 is a sectioned elevation of another form for the absorbent reconcentrator of FIG. 2.

The reconcentrating equipment for the rich absorbent of conduit 22 is generally indicated at 25. FIG. 2 shows the integral arrangement of this equipment to better advantage. In general, FIG. 1 indicates the warm rich absorbent inserted into the upper end of the reconcentrator vessel within which heat is applied by burner 26 while undersaturated gas is flowed upward, through the heating absorbent, in the vessel. The lean absorbent produced is removed through conduit 27.

Conduit 27 takes the hot reconcentrated absorbent to vessel 20 where it is heat exchanged with the cool rich absorbent from the bottom of tower 10. Conduit 28 then directs the cooled lean absorbent through pump 29. This cycle is completed by the insertion of this cool lean glycol into tower 10 through conduit 13. Disclosed in this manner, the system for bringing liquid absorbent into contact with the natural gas stream to be dehydrated, and reconcentrating the absorbent, is conventional. The present invention utilizes the forces of heat and undersaturated gas within unit 25.

USE OF DRY GAS IN THE PROCESS

Assuming the dry natural gas stream in conduit 12 is at a pressure in the order of 800 lbs. per sq. in., regulator 31 receives a portion of the gas in conduit 12 through conduit 30 and reduces this pressure to the order of 90 lbs. per sq. in. in conduit 32. Part of this gas at 90 lbs. per sq. in. can be used in conduit 33 for the pilot gas in the level control of valve 17. Pressure regulator 34 reduces the 90 lbs. per sq. in gas to the order of 15 lbs. per sq. in. for use as pilot gas.

The gas in conduit 32 is also taken through a regulator 35 for reduction to a pressure level which will render it useful in burner 26. The amount of this gas from regulator 35 which is consumed in burner 26 is determined by valve 36 as controlled by a temperature unit 37 in the absorbent being heated within unit 25.

Finally, a regulated portion of the gas of conduit 32 is introduced into unit 25 to drive water from the liquid absorbent which is also being reconcentrated by heat in the unit. A regulator 38 reduces the 90 lbs. per sq. in. gas to 15 lbs. per sq. in. and a manual valve is set with the guidance of rotameter 39 to give the flow desired for the dry gas into the reconcentrator. The effect of dry gas from this source is more completely explained in connection with FIG. 2.

FIG. 2

The reconcentrating equipment 25 is shown on a larger scale than in FIG. 1 and is properly sectioned to illustrate concepts of the present invention. The reconcentration is carried out within one shell, or housing, 40. The rich absorbent of conduit 22 is fed into the top of shell 40, having been warmed by heat exchange with the reconcentrated absorbent in vessel 20. The absorbent, reconcentrated as it passes downward within shell 40, is discharged through conduit 27 and into vessel 20.

A coil 41 is arranged in the upper part of shell 40 to contact absorbent and solute vapors and cool them enough to bring about some condensation of the absorbent vapors. Most of the vapors which leave the top of the shell 40, through conduit 42, are solute vapors, water being the usual solute separated from the absorbent and discharged to waste. The solute-rich absorbent further warmed by this heat exchange through coil 41, is received upon, and distributed by, structure 43 over a cross-section of the shell 40 for continued downward flow.

The shell 40 is packed with material which will spread the liquid absorbent in multiple thin films as the liquid flows downward. This filming of the absorbent promotes both the transfer of heat into the absorbent and intimate contact with undersaturated gas inserted into the lower portion of shell 40. Both conditions are brought about at the same time, within the same flow path and within the one shell 40.

HEAT SUPPLY

The heat for reconcentration is supplied from the conventional firing of a firetube by a burner. In the particular embodiment of the invention disclosed here, firetube 44 is extended up the axis of vertical shell 40. Burner 26 discharges its products of combustion upward, within the firetube. Heat is thereby introduced into the solute-rich absorbent as it travels downward in the shell 40. The solute is thereby boiled off as a vapor and discharged through conduit 42.

It is desired to restrict the heat of tube 44 to the absorbent as it flows downward from distribution by structure 43. Therefore, insulation 45 is provided about the stack on top of tube 44 from structure 43 upward.

Coil 41 can then be arranged in shell 40 about the insulation on the upper stack of tube 44 and function to cool the absorbent vapors evolved by heat of tube 44. This cooling of the absorbent vapors condenses the larger part of them and such condensate drops to the main body of descending absorbent. A balance is struck between the condensation temperatures of the solute and the absorbent vapors so the solute vapors will be discharged to waste through conduit 42 while the absorbent vapors will be condensed and retained with the main body of the absorbent being concentrated as it passed down shell 40.

Of course, the balance of temperatures is not precise. However, the solute is continually worked out of the absorbent and the absorbent is continually washed back down the shell. The solute-rich absorbent in coil 41 picks up heat as it performs its cooling reflux function. All the heating, with exchanger 20 as well as with coil 41, goes to supplement the heat added from tube 44 to vaporize the solute and separate this solute from the absorbent which is descending in shell 40.

PACKING

Shell 40 is packed with material which mechanically films the descending absorbent in the shell and thereby promotes more intimate contact between the vapors and absorbent within the shell. This material forms a body 46, made up of individual units having specific compositions and shape.

The compositions and shape may be selected from a range of commercially available material. It is common to use ceramic but metal may have an advantage in this instance, to convey the heat. This material is given various forms which generate the designations given the final product. As examples, the material may be called "ceramic saddles" or "metallic Pall rings." In any event, the shell 40 is packed with this material around the tube 44, distributor 43 and up to coil 41. The solute-rich absorbent is distributed laterally through this packing and descends in shell 40 to discharge through conduit 27.

STRIPPING GAS

The undersaturated gas used in combination with the heat of tube 44, is distributed laterally in packing 46 by structure 47. From distributor 47, the undersaturated gas ascends up through packing 46, making intimate contact with the multiple films formed of the descending absorbent by the packing material.

It is necessary to clearly appreciate the condition brought about by counter-current flow of heating absorbent and undersaturated gas in the extended vertical length provided by shell 40. Vertically stacked zones are formed in the flow path. Each zone has a different liquid-vapor equilibrum condition depending upon the saturation of the gas, or vapor, and the vapor pressure of the solute in the liquid absorbent.

The least saturated gas, or vapor, is that distributed at 47. As it ascends, it takes on solute from the absorbent. The reverse is true with the descending absorbent as it is being heated. As the absorbent descends it loses solute, both to the gas and because of the heat vaporizing the solute and flowing it upward. Therefore, these are progressive differential liquid-vapor equilibrium conditions brought into existence which result in the absorbed being progressively reconcentrated as solute is driven from the absorbent during its downward flow. This simultaneous heating and vapor equilibrium shifting come together in this elongated vertical flow path with synergistic effect, the result being absorbent more highly reconcentrated than possible with the use of either force separately.

The vertical series of zones can be compared with the conditions existing on a series of vertical trays within a vertical fractionating tower. The result is a one-pass reconcentration of a liquid absorbent to a degree which is unexpected in this art.

FIG. 3

The analogy of the shell 40 of FIG. 2 to a fractionating tower should not obscure the fact that it may be quite practical to employ a structure which actually uses trays to more definitely define the zones of progressive differential liquid-vapor equilibrium.

From outward appearance, the unit 75 is quite similar to unit 25 of FIG. 2. Shell 76 has a firetube 77 extended up its axis, fired by a burner 78 to continually heat the liquid absorbent as it descends.

The solute-rich absorbent is flowed into the top of shell 76 through conduit 79. The lean, reconcentrated absorbent is removed through conduit 80 at the bottom of shell 76. Stripping gas enters shell 76 through conduit 81 and leaves with water vapor, from conduit 82.

A coil 83 receives the absorbent of conduit 79 so the vapors evolved by heating will be cooled to reflux absorbent down the shell 76. However, the absorbent of coil 83 is discharged upon a tray 84 and intimately contacted with ascending vapors flowing up through so-called bubble caps 85 which are mounted on the tray 84.

Trays 85, 86–89 perform the function of packing 46 in FIG. 2 by mixing the liquid absorbent with the vapors ascending the shell 76. Additionally, these trays extend across the annulus between the tube 77 and the inside wall of shell 76 as partitions. Between each of two trays a zone is formed in which the liquid absorbent and vapor seek equilibrium. This equilibrium sought results in progressive removal of solute from the liquid absorbent. The basic phenomena of FIG. 2 takes place, with improvements due to the positive isolation of the vertical zones by the trays. The need for packing is eliminated and the trays can be attached to the tube 77 as fins to conduct heat into the liquid passing over the trays and being contacted by the ascending vapor.

From the foregoing it will be seen that this invention is one well adapted to attain all of the ends and objects hereinabove set forth, together with other advantages which are obvious and which are inherent to the method and apparatus.

It will be understood that certain features and subcombinations are of utility and may be employed without reference to other features and subcombinations. This is contemplated by and is within the scope of the claim.

As many possible embodiments may be made of the invention without departing from the scope thereof, it is to be understood that all matter herein set forth or shown in the accompanying drawings is to be interpreted as illustartive and not in a limiting sense.

The present invention having been described, what is claimed is:

An absorbent reconcentrator comprising,
  a vessel shell extended vertically, heat exchange structure mounted in the upper portion of the vessel and connected to a source of absorbent which has absorbed a solute which is to be removed, the exchange structure arranged to bring the solute-rich absorbent into indirect heat exchange with vapors flowing up the vessel shell,
  means for discharging the rich absorbent from the heat exchange structure and above a lower portion of the vessel and distributing the rich absorbent over a cross section of the lower portion for flow of the liquid down the length of this lower portion of the vessel shell,
  a discharge outlet for the absorbent at the lower portion of the vessel shell,
  a fired tube extending up along the axis of the lower portion of the vessel shell in indirect heat exchange relation with the down-flowing solute-rich absorbent discharged from the heat exchange structure so as to transmit heat into the absorbent all along its downward flow path,
  a discharge stack for the fired tube extending up the upper portion of the vessel and insulated from the upper portion so as not to heat the heat exchange structure and vapors flowing up the upper portion,
  thermal responsive means for the tube firing responsive to the temeprature of the absorbent flowing down the lower portion of the vessel shell,
  combustible gas flow, valve control means regulated by the thermal responsive means,
  means for introducing stripping gas, under-saturated with respect to water vapor, into the lower portion of the vessel shell which flows upward countercurrent to absorbent and concurrent with solute vapors and into the upper portion where absorbent is condensed and from which solute vapors and stripping gas are discharged to atmosphere,
  and packing material in the lower portion of the shell between the fired tube and the inside wall of the shell to further intimate contact between the stripping gas and heated descending less solute-rich absorbent and in the upper portion of the shell to further intimate contact between the ascending vapors and the descending more solute-rich absorbent condensate.

References Cited

UNITED STATES PATENTS

| | | | |
|---|---|---|---|
| 1,996,852 | 4/1935 | Bergell | 159—13 |
| 2,040,837 | 5/1936 | Yarmett | 196—90 |
| 2,089,945 | 8/1937 | Converse et al. | 23—103 |
| 2,341,258 | 2/1944 | Appell | 260—535 |
| 2,756,029 | 7/1956 | Brogdon | 122—32 |
| 2,779,724 | 1/1957 | Dunning et al. | 159—13 X |
| 2,944,966 | 7/1960 | Eickmeyer | 261—112 X |
| 3,182,434 | 5/1965 | Fryar | 55—32 |

NORMAN YUDKOFF, *Primary Examiner.*

J. SOFER, *Assistant Examiner.*